United States Patent [19]

Karoake et al.

[11] Patent Number: 5,411,609
[45] Date of Patent: May 2, 1995

[54] SECTION STEEL WIRE OF OIL RING

[75] Inventors: Takao Karoake, Shimane; Ken Nakamura; Iwao Kashiwagi, both of Yasugi, all of Japan

[73] Assignee: Hitachi Metals, Ltd., Tokyo, Japan

[21] Appl. No.: 138,050

[22] Filed: Oct. 19, 1993

[30] Foreign Application Priority Data

Oct. 23, 1992 [JP] Japan .................................. 4-285997
Oct. 26, 1992 [JP] Japan .................................. 4-287411
Oct. 29, 1992 [JP] Japan .................................. 4-291234

[51] Int. Cl.6 ......................... C22C 37/00; F16J 9/00
[52] U.S. Cl. .................... 148/325; 277/DIG. 6; 277/236
[58] Field of Search .................. 148/598, 325, 318; 277/DIG. 6, 236, 235 R

[56] References Cited

U.S. PATENT DOCUMENTS 4,214,762 7/1980 McCormick et al. ............. 277/138

FOREIGN PATENT DOCUMENTS 0356615 4/1989 European Pat. Off. .
2129091 3/1983 United Kingdom .
2254395 1/1992 United Kingdom .
2254395 1/1992 United Kingdom .

OTHER PUBLICATIONS

Patent Abstracts of Japan vol. 7, No. 392 (M-1450) 22 Jul. 1993 & JP-A-05 071 642 (Hitachi Metals Ltd.) 23 Mar. 1993 *abstract*.
Patent Abstracts of Japan vol. 6, No. 236 (M-173) 25 Nov. 1982 & JP-A-57 137 028 (Kawasaki) 24 Aug. 1982 *abstract*.

Primary Examiner—Deborah Yee
Attorney, Agent, or Firm—Antonelli, Terry, Stout & Kraus

[57] ABSTRACT

A section steel wire for an oil ring for use in an internal combustion engine, consisting essentially of, by weight, 0.6 to 1.5% carbon, not more than 1.5% Si, not more than 1.5% Mn, more than 20% and not more than 25% Cr, and optionally containing at least one group selected from three groups consisting of a group of at least one element of Mo and W in total amount of not more than 3% of "Mo+W/2", another group of at least one element of V and Nb in total amount of not more than 3% of "V+Nb/2" and still another group of at least one element selected from not more than 12% Co, not more than 5% Ni and not more than 5% Cu, and balance of Fe and unavoidable impurities. The section steel wire has a Vickers hardness of HV 300 to HV 450 and has a substantially H-or X-shaped cross-section. A thickness ratio of the thickness of the web portion bridging the flange portions to the total thickness (T) of the flange portions is not greater than 0.3.

7 Claims, 4 Drawing Sheets

T : THICKNESS
W: WIDTH OF FLAT PORTION OF WEB
B : WIDTH

T : THICKNESS
W : WIDTH OF FLAT PORTION OF WEB
B : WIDTH

SECTION STEEL WIRE OF OIL RING

FIELD OF THE INVENTION

The present invention relates to a section steel wire for an oil ring for use in an internal combustion engines, and a method of manufacturing the same. Herein, the section steel wire means a steel wire having a complicated cross-sectional shape, such as H- or X-shape.

TECHNICAL BACKGROUND

The types of steel oil rings for internal combustion engines are categorized into a conventional three-piece type oil ring composed of two rings each having a rectangular cross sectional shape and one spring, and a two-piece type oil ring composed of one section wire ring having a groove and one spring.

Recently there has been a desire to change the three-piece type oil ring to the two-piece type oil ring in order to reduce the cost by decreasing the number of elements. A section wire ring having a groove to form the two-piece oil ring has a complicated cross sectional shape, for example, a substantially H- or X-shape. Further, the ratio of the thickness of a web portion connecting the two lateral end flange portions with respect to the overall thickness of each of the lateral end flange portions is very small, resulting in a considerably great degree of deformation.

Further, the material of a piston ring has been needed to be highly alloyed for improving wear resistance, scuff resistance and sulfate corrosion resistance and the like.

Since a pressure ring among the piston rings has a rectangle-like simple cross sectional shape, it does not encounter a critical manufacturing problem. Therefore, high-alloying to 17Cr and to 20Cr-type martensitic stainless steel has been established.

A side rail of a three-piece-combined oil ring has been made of JIS SUS420J2 (0.35C–13Cr type) or 0.65C13Cr type martensitic stainless steel. Also the side rail of the foregoing type has a rectangle-like simple cross sectional shape. Therefore, a side rail of the foregoing type can be manufactured by a conventional cold rolling method or a cold drawing. The rails for the three-piece oil rings have been disclosed in JP-B2-61-54862 (0.65C–13Cr type) and JP-A-61-59066 (0.55C–7Cr type).

Also the oil ring needs to be made of highly alloyed material, and the wear resistance and corrosion resistance can be expected if the two-piece type oil ring is made of highly alloyed material.

However, it is very difficult for a section wire ring having a groove for use in the two-piece type oil ring to be made of martensitic stainless steel containing carbon at a higher ratio as compared with the conventional material, for example, containing, carbon by 0.8 wt% or more and chromium by 15 wt% (hereinafter wt% will be abbreviated to "%") or more. The reason for this is that a ring of the foregoing type has a complicated cross sectional shape and deformed by an excessively higher degree. That is, the cross sectional shape is excessively different from the round or rectangular shape, and therefore, a high plastic working reduction is necessary to form the section shape. In particular, it has been experimentally determined that the structure in which the web portion which is strongly compressed vertically in thickness and flange portions which are not compressed vertically are disposed adjacently results boundary portions which can be very easily cracked. Further, the purpose of use of the oil ring necessitates that the surface roughness must be 3S or lower. In addition, the surface condition is severely restricted to be free from a dent and abrasion. The conventional cold drawing method encounters deterioration in the workability due to high-alloying. Further, the excessively large degree of deformation causes the working cracks to easily take place at boundaries between the web portion and the flange portions as described above. In order to prevent the foregoing problems, the working ratio per one pass or per one annealing process is limited excessively. As a result, the number of passes and annealing processes increase the obtain the final product, resulting in that the surface condition can easily be damaged during the foregoing process or at the time of handling the ring. What is worse, a problem of high cost arises. Hence, a two-piece type oil ring made of martensitic stainless steel containing more than 0.8% carbon and not less than 15% chromium has not been produced.

In order to overcome the foregoing problems, it has been determined that a section wire having a complicated cross sectional shape for use to make an oil ring that has characteristics, such as corrosion resistance and wear resistance, that are required for the oil ring to possess. Further, in Japanese Patent Application Serial No. 3-19302 (1991), a method of manufacturing the section wire for making the steel oil ring is characterized in that a roll die for warm working is proposed. The material disclosed as described above is martensitic stainless steel containing carbon in a quantity more than 0.8% and less than 0.95%, and 15% to 20% chromium and having a complicated lateral cross sectional shape, the foregoing martensitic stainless steel being enabled to be manufactured by the foregoing disclosed method.

The section wire for the two-piece type oil ring must be formed to have a predetermined cross sectional shape and have a plurality of oil passage holes formed in the web portion in a straight array at any step in the manufacturing process. The method of piercing the holes is substantially limited to a punching method in terms of reducing the working cost and improving the working efficiency. However, it has been found that it is very difficult to pierce the foregoing section wire because the material to be worked has been highly alloyed.

Although the oil passage holes can be, by punching, formed in the foregoing low alloy steel even if the material has been quenched and tempered to predetermined hardness of HV300 to 450, the highly-alloyed steel composed as described above cannot be substantially punched by the conventional manufacturing method even if it has been heated to have similar hardness. Further, punching, that can be performed after the conventional low-alloy material has been machined to have a predetermined cross sectional shape, cannot be adapted to the foregoing highly-alloyed material.

Further, it has been found that forming, into a predetermined cross sectional shape, high carbon and high chromium wire material having a substantially the same or substantially the same chemical composition (Cr: 15.0 to 20.0) as that of the material disclosed in Japanese Patent Application Serial No. 3-19302 and subjecting it to continuous annealing under tension enables wire material for an oil ring having a deformed cross sectional shape that exhibits excellent straightness to be obtained. Further, the process for limiting the obtained material to predetermined dimension enables the oil passage holes to be formed by punching. The foregoing technology was disclosed in JP-A-4-333545 (1992). The foregoing dimensional limit sometimes restricts the width b (see FIG. 1) of the pierced oil hole, that is, the cross sectional area of the oil hole, that is, the oil scraping performance. There have been examined to use of low grade fuel, introduce combustion gas into the engine to clear an exhaust gas regulation, use alcohol-type fuel and that of natural gas type fuel in additional to the improvement in the performance of engines, resulting in that a portion of the foregoing technologies has been subjected to actual running tests. There arises a desire of providing, for the foregoing combustion engines, an oil ring exhibiting excellent seizure resistance and corrosion resistance superior to those of the conventional material because the oil deterioration speed is increased and the lubricating ability deteriorates due to a fact that a lack of a supply of oil occurs due to a high speed engine speed, a proportion of water generated after combustion is increased, corrosion is caused to occur easily by sulfur oxides, and corrosion easily takes place due to the presence of carboxylic acid. Recently, there is a trend of using the two-piece type oil ring in a small-size internal combustion engine. Another tendency arises in that the cross sectional area of the oil ring for use in a large-size engine is decreased to reduce the weight of the engine and to reduce the weight of the piston ring. There is another technology about the cross sectional shape of the oil ring that the mutual distance between the flanges, which are brought into contact with the inner surface of the cylinder, is shortened.

Since the foregoing dimensional limitation employed in the foregoing disclosure results in a decrease of the thickness of the piercing punch in proportion to the widthwise dimension of the recessed portion of the wire for the ring, the piercing punch can easily be broken and the oil discharge performance easily deteriorates.

SUMMARY OF THE INVENTION

An objective of the present invention resides in providing a section steelwire of oil ring obtained by improving the section wire disclosed in Japanese Patent Application Serial No. 3-19302 and the method of manufacturing the same such that a larger amount of chromium and further alloying elements are contained to improve seizure resistance and corrosion resistance against sulfur oxides and carboxylic acid, and that the section steel wire exhibits superior oil scraping ability and has a small cross sectional area as compared with that disclosed in JP-A-4-333545 (1992), and a method of manufacturing the same. It has been experimentally determined by an examination of a combination of wire warm-drawing and cold rolling and a combination of warm drawing and warm rolling in order to realize an alloy composition and a manufacturing method therefor with which generations of micro-voids and surface flaws during drawing or rolling can be prevented. As a result, it was found that use of a warm roller die in accordance with the method disclosed in Japanese Patent Application Serial No. 3-19302 (1991) enabled a wire having a complicated cross sectional shape and exhibiting high accuracy to be produced from stainless steel containing chromium by a large amount exceeding 20%.

According to a first aspect of the present invention there is provided a section steel wire for an oil ring for use in an internal combustion engine, chemically consisting essentially of, by weight:

0.6 to 1.5% carbon, not more than 1.5% Si, not more than 1.5% Mn, more than 20% and not more than 25% Cr, and optionally containing at least one group selected from three groups consisting of a group of at least one element of Mo and W in total amount of not more than 3% of "Mo+W/2", another group of at least one element of V and Nb in total amount of not more than 3% of "V+Nb/2" and still another group of at least one element selected from not more than 12% Co, not more than 5% Ni and not more than 5% Cu, and balance of Fe and unavoidable impurities, wherein:

the section steel wire has been subjected to a quenching heat-treatment followed by a tempering heat-treatment so as to have a Vickers hardness of HV 300 to HV 450, the section steel wire has a substantially H- or X-shaped cross-section, having a web portion and flange portions, which is provided by working a blank steel wire having a rectangular or square cross-section by forming longitudinal recesses on two opposing sides of the rectangular blank steel wire respectively, and a thickness ratio of the thickness of the web portion bridging the flange portions to the total thickness (T) of the flange portions is not greater than 0.3.

In the above section steel wire, the web portion has a plurality of oil passage holes being formed by punching in a longitudinal linear row line, and at least one of the opposed surfaces of the web portion is substantially flat, and wherein the following conditions are met:

$$W - b \geq 0.4\, t$$

$$C \geq t$$

wherein:
W=a specified width of the substantially flat surface of the web portion,
b=a breadth of the oil passage hole,
t=a height of a breadth wise wall surface of the oil passage hole, and
C=the spacing between adjacent oil passage holes.

Herein, the specified width (W) is of the length between two crossing points of contour lines of the flat web portion and the respective inner surfaces of the flange portions.

The section steel wire preferably has a width of not greater than 3.0 mm, wherein dispersion of the width is not greater than 0.015 mm after a finishing plastic working process but before a grinding process.

In accordance with further features of the present invention, there is provided the following wire of oil ring based on a knowledge which enables the dimension and material limitation present for oil passage holes formed by punching and disclosed in JP-A-4-333545 to be relieved by employing results of ensuring tests and a novel producing method and the novel confirmed region is regulated:

The section steel wire mentioned above chemically consists essentially of, by weight:

more than 0.80% and less than 0.95% carbon, not more than 1.0% Si, not more than 1.0% Mn, not less than 15.0% and not more than 20.0% Cr, and optionally containing at least one group selected from three groups consisting of a group of at least one element of Mo and W in total amount of not less than 0.5% and not more than 3% of "Mo+W/2", another group of at least one element of V and Nb in total amount of not less than 0.05% and not more than 2% of "V+Nb/2" and still another group of at least one element selected from not more than 12% Co, not more than 5% Ni and not more than 5% Cu, and balance of Fe and unavoidable impurities, wherein the following conditions are met:

$$1.4t > W - b \geq 0.4 t$$

$$C \geq t$$

The section steel wire preferably has a width of not greater than 3.0 mm, wherein dispersion of the width is not greater than 0.015 mm after a finishing plastic working process but before a grinding process.

According to a third aspect of the present invention, there is provided the following wire:

A section steel wire for an oil ring for use in an internal combustion engine, having a surface treatment layer formed on at least a sliding surface thereof which makes a sliding contact with an inner surface of a cylinder of the internal combustion engine, and chemically consisting essentially of, by weight:

0.6 to 1.5% carbon, not more than 1.5% Si, not more than 1.5% Mn, more than 20% and not more than 25% Cr, and optionally containing at least one group selected from three groups consisting of a group of at least one element of Mo and W in total amount of not more than 3% of "Mo+W/2", another group of at least one element of V and Nb in total amount of not more than 3% of "V+Nb/2" and still another group of at least one element selected from not more than 12% Co, not more than 5% Ni and not more than 5% Cu, and balance of Fe and unavoidable impurities, wherein:

the section steel wire has been subjected to a quenching heat-treatment followed by a tempering heat-treatment so as to have a Vickers hardness of HV 300 to HV 450, the section steel wire has a substantially H- or X-shaped cross-section, having a web portion and flange portions, which is provided by working a blank steel wire having a rectangular or square cross-section by forming longitudinal recesses on two opposing sides of the rectangular blank steel wire respectively, and a thickness ratio of the thickness of a web portion bridging flange portions to the total thickness (T) of the flange portions is not greater than 0.3, the web portion having a plurality of oil passage holes being formed by punching in a longitudinal linear row line, at least one of the opposed surfaces of the web portion being substantially flat, and wherein the following conditions are met:

$$W - b \geq 0.4 t$$

$$C \geq t$$

wherein:

W = a specified width of the substantially flat surface of the web portion,
b = a breadth of the oil passage hole,
t = a height of a breadth wise wall surface of the oil passage hole, and
C = the spacing between adjacent oil passage holes.

In accordance with further features of the present invention there is provided the following wire:

A section steel wire for an oil ring for use in an internal combustion engine, having a surface treatment layer formed on at least a sliding surface thereof which makes a sliding contact with an inner surface of a cylinder of the internal combustion engine, and chemically consisting essentially of, by weight:

more than 0.80% and less than 0.95% carbon, not more than 1.0% Si, not more than 1.0% Mn, not less than 15.0% and not more than 20.0% Cr, and optionally containing at least one group selected from three groups consisting of a group of at least one element of Mo and W in total amount of not less than 0.5% and not more than 3% of "Mo+W/2", another group of at least one element of V and Nb in total amount of not less than 0.05% and not more than 2.0% of "V+Nb/2" and still another group of at least one element selected from not more than 12% Co, not more than 5% Ni and not more than 5% Cu, and balance of Fe and unavoidable impurities, wherein:

the section steel wire has been subjected to a quenching heat-treatment followed by a tempering heat-treatment so as to have a Vickers hardness of HV 300 to HV 450, the section steel wire has a substantially H- or U-shaped cross-section, having a web portion and flange portions, which is provided by working a blank steel wire having a rectangular or square cross-section by forming longitudinal recesses on two opposing sides of the rectangular blank steel wire respectively, and a thickness ratio of the thickness of a web portion bridging flanges to the total thickness (T) of the flange portions is not greater than 0.3, the web portion having a plurality of oil passage holes being formed by punching in a longitudinal linear row line, at least one of the opposed surfaces of the web portion being substantially flat, and wherein the following conditions are met:

$$W - b \geq 0.4 t,$$

$$C \geq t,$$

wherein:

W = a specified width of the substantially flat surface of the web portion,
b = a breadth of the oil passage hole,
t = a height of a breadth wise wall surface of the oil passage hole, and
C = the spacing between adjacent oil passage holes.

According to a fifth aspect of the present invention, there is provided a method of producing a section steel wire having a plurality of oil passage holes for use as a material of a two-piece oil ring of an internal combustion engine, the section steel wire having a substantially H- or X-shaped cross-section, having a web portion and flange portions, wherein the method comprising the steps of:

deforming a blank steel wire having a rectangular or square cross-section to obtain the section steel wire without the oil passage holes;

piercing the above deformed section steel wire to form the oil passage holes; and passing the pierced section steel wire through a working pass of at least one pair of rolls to press it from the breadwithse direction for a sizing purpose.

The section steel wire of the oil ring according to the present invention is formed to have the cross-sectional shape by using a roller die for warm working. The employment of the roller dies enables a strong lubricant, such as a metallic soap, that has been required in a single body die to be omitted. The such lubricant cannot easily be removed after the drawing process has been completed, and the incomplete removable of the lubricant causes a rough surface to occur during intermediate annealing process. Since the strong lubricant can be omitted in the present invention, the surface shape can be maintained at a desired accuracy. Further, employment of a warm working process protects a material, which can easily be broken due to high alloying that deteriorates the deformation ability, from occurrence of cracking so that a predetermined cross sectional shape exhibiting a large degree of deformation can be efficiently be formed while preventing accumulation of strain by working, thus omitting the intermediate annealing and maintaining the grade of the surface condition. Further, the warm working method using the roller die enables an effect of expanding the material into the rollers having a pass defined thereby to be obtained so that sharp longitudinal edges can be obtained.

It is preferable to raise the temperature for the warm working to a degree so far as quenching hardening does not take place to obtain satisfactorily the effect (the capability of omitting the intermediate annealing and the decreasing the needed number of times) of the warm working process. Further, it is preferable to employ a high-frequency induction heating method because a risk of sparking involved in a direct electroheating method can be eliminated and its capability of rapid heating prevents the deterioration of the surface shape occurring due to oxidation.

The section steel wire subjected to the warm working process using the roller die and the cold working process is annealed under tension, and then the oil passage holes are formed in the web portion by punching. Then, expansion is, if necessary, modified by using rollers having a pass, and then oil present thereon is removed before it is subjected to heat treatment to have predetermined hardness of from HV 300 to 450 by a continuous quenching and tempering heat treatment apparatus into which a protective atmosphere has been introduced. Usually, the section wire is, in this state, sent to a piston manufacturer.

A material subjected to the heat treatment in the continuous heat treatment furnace exhibits an excellent uniformity in the longitudinal direction thereof. It leads to a fact that the spring back dispersion occurring in the curling process can be prevented. As a result, uniform bent shapes can be formed.

Other and further objectives, features and advantages of the invention will be appear more fully from the following description.

DETAILED DESCRIPTION OF THE INVENTION

Figure 1:
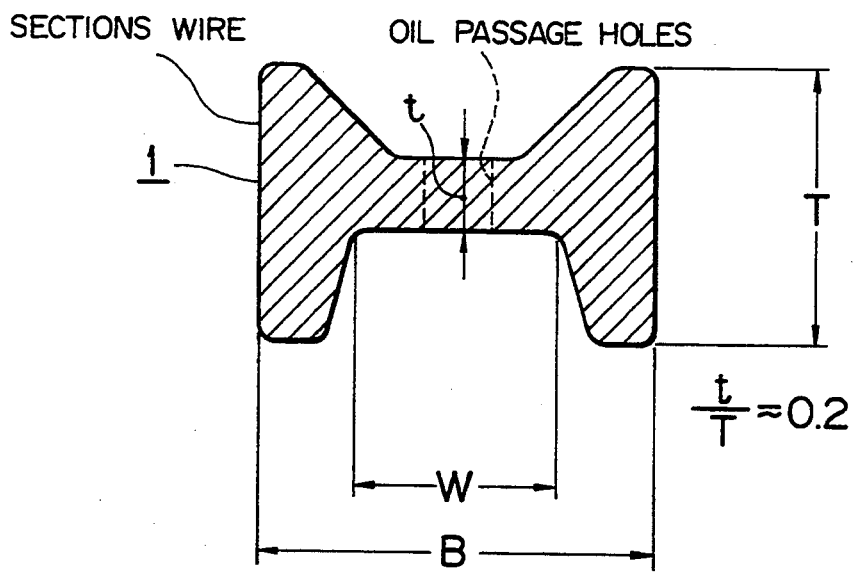
FIG. 1 is a cross sectional view of a two-piece type oil ring for an internal combustion engine according to the present invention.

The reason why the ratio of thickness of the web portion with respect to the total thickness of the section wire according to the present invention is limited to not greater than 0.3 is that the foregoing condition enables an optimum effect of employing a warm working method to be obtained. That is, employment of the warm working method enables occurring of cracks to be prevented and enables a desired surface shape to be maintained. Further, the foregoing value can be achieved by the warm working method.

The reason why the hardness range is made to be HV 300 to 450 will now be described. If the hardness exceeds HV 450, spring back becomes too large in a curling process, resulting in a problem that the shape formed by the curling process cannot be maintained at a predetermined range. What is worse, the material can easily be broken at the time of the curling process. The foregoing limitation is an essential condition for manufacturing the oil ring having the deformed cross sectional shape. If the hardness is less than HV 300, wear resistance deteriorates undesirable to realize the object of using a highly alloyed material. In this case, a predetermined life for the ring cannot be realized. A preferred hardness ranges from HV 360 to HV 430.

The section wire according to the present invention is formed into a predetermined shape by bending, and it is subject to surface treatment, such as nitriding. Then, the surface which is brought into contact with an inner surface of a cylinder and the surface of edges, that is, the surfaces which are brought into contact with the ring groove formed in the piston are finished by slight grinding. Therefore, the inner surface of the ring formed by bending is brought into direct contact with the spring must have surface roughness of 3S or greater Over the entire surface. It is preferable that the foregoing surface treatment be nitriding process in terms of improving wear resistance.

Carbon is combined with additive elements of, such as Mo, W, V and Nb, to form carbides to contribute to improve wear resistance and seizure resistance. Further, a part of carbon dissolves into matrix to strengthen the litter. In order to obtain the foregoing effects, carbon must be added by 0.6% or more. Because the oil ring according to the present invention has the deformed cross sectional shape, addition of carbon by 1.5% or more causes the manufacturing facility and the ring formability to deteriorate even if the warm working method is employed. If carbon is added by a quantity larger than 1.5%, carbides are prepared excessively, and therefore sulfate corrosion resistance deteriorates. Therefore, carbon is added by 0.6 to 1.5%, more preferably from 0.8% to 1.2%.

Silicon is added for deoxidation during refining the steel, silicon being an element that is effective to improve sulfate corrosion resistance, the quenching facility and the strength. If silicon is added by a quantity more than 1.5%, the warm workability deteriorates. Furthermore, silicon is added by not more than 1.5%, preferably 1.0% or less.

Manganese is added for desulfurizing at the time of refining the steel. If manganese is added by a quantity more than 1.5%, the hot workability deteriorates at the time of manufacturing the element wire. Therefore, the quantity is limited to 1.5%, preferably not more than 1.0%.

Chromium is combined with carbon as described above so that carbides ($M_{23}C_6$ type or $M_7C_3$ type carbide) are formed so that wear resistance and the seizure resistance are improved. Therefore, chromium is an indispensable element for the oil ring according to the present invention. Further, a part of chromium dissolves into matrix to improve oxidation resistance and seizure resistance. Further, nitriding causes a hard nitrided layer to be generated so that oxidation resistance and seizure resistance are significantly improved. In order to obtain the foregoing significant effect, chromium must be added by a quantity more than 20.0%. It has been experimentally determined that in amount of carbides is unsatisfactory if a quantity of chromium is not more than 20%, and therefore the corrosion loss increases in sulfuric acid. If chromium is more than 25.0%, carbide amount is excessively increased and amount of chromium nitride is enlarged excessively in the case where nitriding is performed. Therefore, the sulfate corrosion resistance deteriorates. As a result, chromium amount is limited to a range from more than 20.0% to not more than 25.0%.

Molybdenum and tungsten have a relationship that Mo is equivalent to W/2 to cause the same effect to be obtained. The above elements are combined with carbon to form carbides thereof and dissolves into chromium carbides to strengthen chromium carbides and to improve softening resistance during tempering. Therefore, an effect can be obtained in that deterioration of the hardness taking place due to heating performed during forming the piston ring and during nitriding can be prevented. Further, the foregoing elements contribute to forming the nitrided layer if nitriding is performed so that wear resistance and seizure resistance are improved. Further, molybdenum has an effect to improving sulfate corrosion resistance. If amount of "M+W/2" is more than 3.0%, quantity of hard carbides increases, causing fatigue strength to be deteriorated. Further, molybdenum and tungsten are costly elements. Therefore, Mo and/or W/2 is limited to 3.0% or less. Molybdenum and tungsten are effective to improve the softening resistance even if a small quantity is added, such that addition of Mo+W/2" by about 0.2% enables an effect to be obtained. A preferred range of addition of Mo+W/2" is 0.3 to 2.0%.

Vanadium and niobium hold a relationship in terms of obtaining effects that vanadium is equivalent to Nb/2. Both of the two elements are effective to refine crystal grains to contribute to improve toughness of the piston ring. Further, the two elements respectively form their carbides similarly to molybdenum and tungsten, and also they dissolves into chromium carbides. As a result, the addition of the foregoing elements satisfactorily improves the wear resistance and seizure resistance. Further, the two elements are able to improve sulfate corrosion resistance and carboxylic acid corrosion resistance. In order to obtain the foregoing effects, vanadium and/or niobium must be added while making a relationship "V+Nb/2". If the elements are added excessively, MC-type carbides are generated excessively, and therefore toughness deteriorates. Therefore, the quantity of "V+Nb/2" is added less than 3.0%, preferably 0.2 to 2.0%.

Cobalt, nickel and copper are important elements for the present invention that improve sulfate corrosion resistance of the nitrided layer. The foregoing three elements do not form carbides, are dissolved into matrix, and improve sulfate corrosion resistance, while exhibiting their characteristics that their effects are maintained in the nitrided layer because they do not generate nitrides. Therefore, a satisfactory effect can be Obtained if they are used to make the piston ring according to the present invention that are subjected to the nitriding process. If Co amount is more than 12%, hot workability and cold workability deteriorate. If nickel amount is more than 5.0%, predetermined hardness cannot be realized after heat treatment. It is therefore preferable to add Co by not more than 12% (more preferably 1.0 to 10.0%) and Ni by not more than 5.0%, more preferably 0.2 to 3.0%.

Since copper improves seizure resistance and corrosion resistance against carboxylic acid, it is preferable for the present invention to add positively copper. Steel containing copper enables a piston ring to be manufactured which exhibits superior corrosion resistance to the conventional material against a corrosive atmosphere, such as combustion gas, such as alcohol fuel. In order to obtain satisfactorily the foregoing effects, it is preferable to add copper. If the amount exceeds 5.0%, hot workability deteriorates. Therefore, copper is added by not more than 5.0%, preferably 0.5 to 3.0.

Phosphorus, sulfur, oxygen and nitrogen may be contained by a small amount respectively as impurities.

The dimensional limitations of the oil passage holes according to the present invention will now be described.

Figure 6:
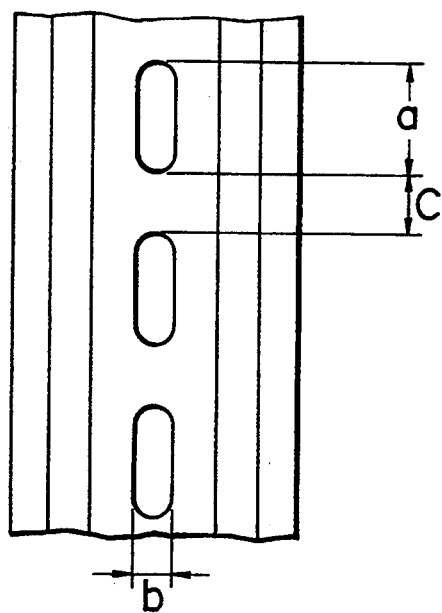
FIG. 6 illustrates an example of a plain shape of the material subjected to the punching process and also explains symbols given to dimensions.

The concept of the dimensional limitations of the oil passage holes disclosed in JP-A-4-333545 will now be described. A deformed wire 11, which is the material to be punched, is guided and held by dies 25, lateral guides 21 and a punch guide 20 also serves as an upper guide in such a manner that the deformed wire 11 can be intermittently moved in the axial direction while maintaining a small gap. Since the punch 24 has a large compression ratio expressed by a/b≃5 to 3 as shown in FIG. 6 when each dimension is given symbols, "W−b" is the width of a portion that must bear the punching force. On the other hand, it is considered that the punching force is in proportion to the height t of the side surface of the pierced oil hole which typifies the area of the inner wall of the pierced oil hole. It has been experimentally determined that it is necessary to meet the relationship W−b≧1.4 t in order to maintain the strength of the die to perform smoothly the punching work. Another relationship expressed by C≧t must be met. The latter condition is important to prevent propagation of cracks at the time of forming the ring by bending rather than to perform the punching work, the ring forming work being performed after the punching work has been performed. That is, if C<t, penetration of cracks in the portion having dimension c easily takes place.

Although JP-A-4-333545 was disclosed in accordance with the foregoing concept, the ensuing improvements in the accuracy of the punching tool (the punch and the die) and in the way of handling the material to be punched resulted in a knowledge to be found that the limitation can be relieved to about $W-b \geqq 0.8$ t. The foregoing face was disclosed as Japanese Patent Application Serial No. 4-291234 by the inventor of the present invention.

Further, there recently arises the foregoing desire for reducing the cross sectional area such that the width of the H-shape cross sectional shape is narrowed to be greater than 3.0 mm and for shortening the interval between the flanges that are brought into contact with the inner surface of the cylinder. Therefore, the width W of the flat portion of the recessed groove has been usually narrowed. Therefore, dimension b (the thickness off the punch=the width of the pierced oil hole) is decreased in proportion to the width W, resulting in that the oil discharging performance deteriorating. Therefore, the breakage of the punch takes place, and therefore the punching work cannot be performed.

As a result of experiments about the punching work, the punching work can be performed smoothly if the dimension be is substantially 0.5 mm or more.

Figure 7:
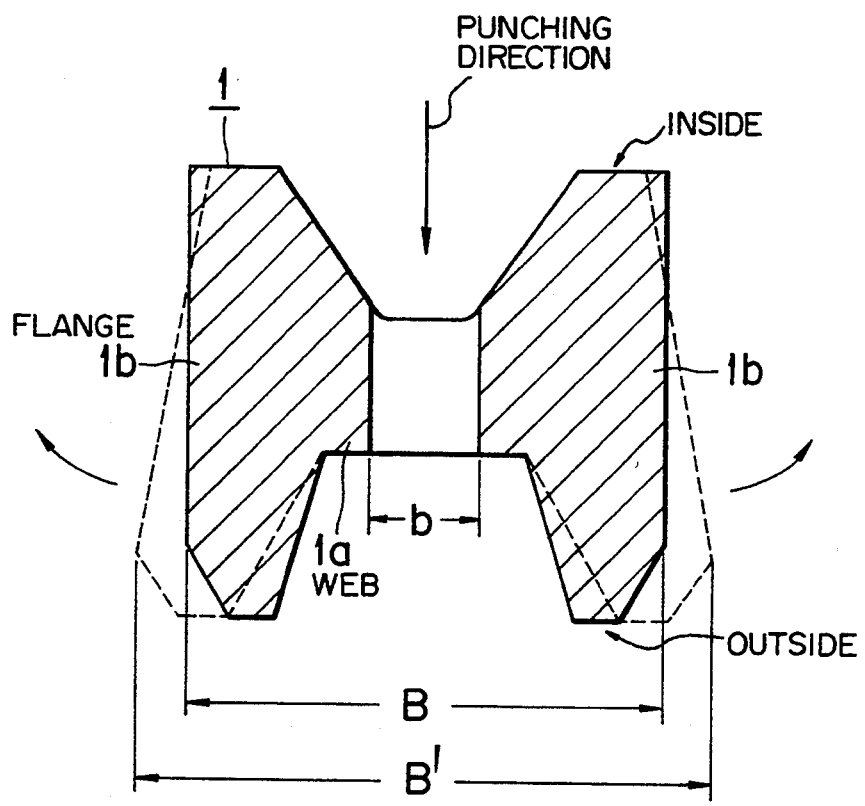
FIG. 7 illustrates deformation occurring due to forming of the oil passage holes by punching at the time of subjecting the wire having the complicated cross sectional shape to the punching process.

As designated with dashed line in a somewhat exaggerated manner in FIG. 7, it was found that, if the punching work is performed in a state where the width W is too small and therefore the dimension $W-b$ does not meet the foregoing requirement, the two flange portions 1b are deformed such that they do not run parallel and they are separated from each other (B′>B). Further, it was found that the deformation can be satisfactorily precisely corrected by employing a pass in which the flange portions are pressed from the two side portions by using an opening mold consisting of a pair of rollers after the punching work has been performed, and accordingly the limitation involved in JP-A-4-333545 can be relieved. The foregoing fact is disclosed in JP-A-4-291234.

The foregoing modification can be somewhat performed even if a system is employed which consists of a pair of rolls (two-way rolls) that presses the material in the widthwise direction and guide units respectively disposed in front of and in the rear of the rolls. However, if the adjustment is performed incompletely (if excessively pressed or inadequate guide units are used), a partial reduction in the widthwise dimension easily takes place, causing a careful attention to be paid.

Therefore, it is preferable to use, in addition to the foregoing system consisting of the guide units and the pair of rolls, a roll set comprising a four-way roll unit consisting of a pair of rolls having projections that come in contact with the right and left inner wall surfaces of the groove-shape recesses formed vertically, preferably excluding the bottom surfaces. If the modification is performed as described above, the contact pressure of the material to be machined can be increased, and therefore, excessive pressure application can be prevented. Further, if the guide units are adjusted unsatisfactorily, generation of the widthwise dimension reduction can be satisfactorily prevented. The foregoing modification rolls may be the rolls that are adapted to perform the finishing process for forming the cross sectional shape of the wire material according to the present invention. It has been found that giving of a slight plane depression rate in the foregoing modification process causes a further satisfactory modification effect to be obtained.

As a result of ensuring improvements, a fact was found that if $W-b \geqq 0.46$, performing of the foregoing modification after the punching operation has been performed enables, similarly to the deformed wire having a small cross sectional area, a satisfactorily practical deformed wire for oil ring to be obtained. If $(w-b)/t$ is too small, the punching die must bear a severally large load, resulting in excessive cracks and wear to occur. Therefore, it is preferable that the foregoing value be 0.8 or more.

EXAMPLE 1

Table 1 shows the chemical compositions of the oil rings according to the present invention that have been evaluated variously. Section wires given sample No. 1 to No. 23 are of oil rings according to the present invention. Section wires given sample No. 26 to No. 28 are of conventional oil rings. No. 26 sample is SKD61 steel, while No. 27 and No. 28 samples respectively are 13Cr-type material and 17Cr-type material that are most widely used as the oil rings for present gasoline-engine vehicles.

Each of coil materials composed as shown in Table 1, having as diameter of about 6 mm, subjected to hot rolling and then subjecting to annealing was shaved so that surface flaws were removed. Then, a warm straightening machine was used so that wires each having a diameter of 4.0 mm were formed, and then four-way drive rolls (vertical drive rolls and horizontal drive rolls) were used, so that flat wires each having a rectangular cross sectional shape and round corners were obtained.

By using a series machining apparatus including an unwind roller 2, a roller corrector 3, a high-frequency heating unit 4, a temperature measuring unit 5, drive rolls having an opening for forming groove, a dryer 8, a cooling unit (water-cooling type) 7, a dimension measuring unit 9 and a winding roller 10, the wires 1 thus-obtained were subjected to a deformed rolling work with a warm rolling die at temperature of about 800° C. while forwarding through a plurality of passes of roller dies.

Figure 2:
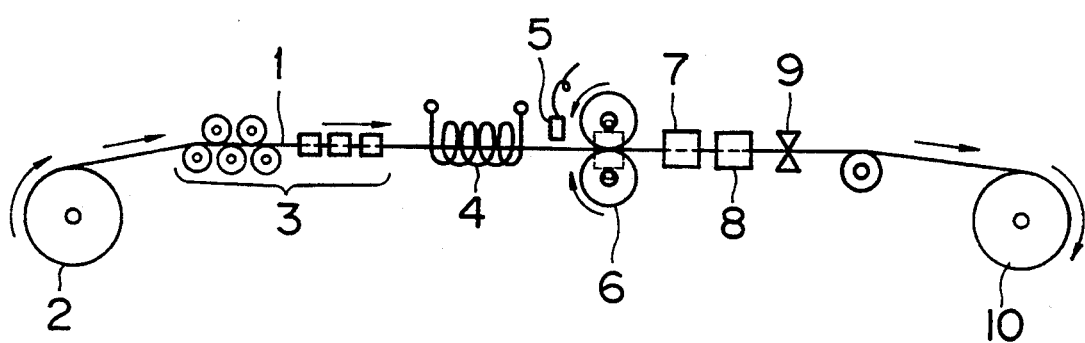
FIG. 2 is a schematic system view which illustrates a warm roller die (a roller die for warm working) working apparatus for use to manufacture the oil ring according to the present invention.

Further, an apparatus structured similarly to the apparatus shown in FIG. 2 except for an arrangement that the foregoing heating unit and the temperature measuring unit were omitted was used to perform cold finishing, so that deformed wires each having grooves were obtained, the obtained deformed wires having a cross sectional shape schematically shown in FIG. 1, wherein the ratio (t/T) of the web thickness tw with respect to the total thickness T is about 0.2. The detailed cross sectional dimensions were as follows: the width B=3.1 mm, the total thickness T=2.9 mm, W=1.0 mm, the web thickness is equal to t (the height of the wall surface in the widthwise direction of the oil hole)=0.6.

The wires thus-manufactured were continuously annealed, and then cracks were detected by an eddy current method. As a result, no cracks were detected in any surface including the boundaries between the web and the flanges. Then, pierced oil holes (width b=0.5 mm and 0.65 mm, hole interval C=3.0, $W-b=1.0-0.5=0.83$ t, $w-b=1.0-0.65=0.35=0.58$ t) were formed by punching, and then the wires were subjected to heat treatment to be quenched and tempered in a continuous furnace. The surface roughness was evaluated by a tracer method after the heat treatment has been performed, resulting in the each material exhibited the surface roughness of 0.6 to 1.4 μm Rax which met the regulation of 3S or lower. Further, the dimension tolerance for each portion (the severest tolerance was 0.06 mm) was met.

No. 1 to No. 28 samples were curled into annular shapes each having a predetermined diameter, and the joints were jointed together before nitriding was performed. Treatment of each of the foregoing samples did not encounter any problem.

Figure 3:
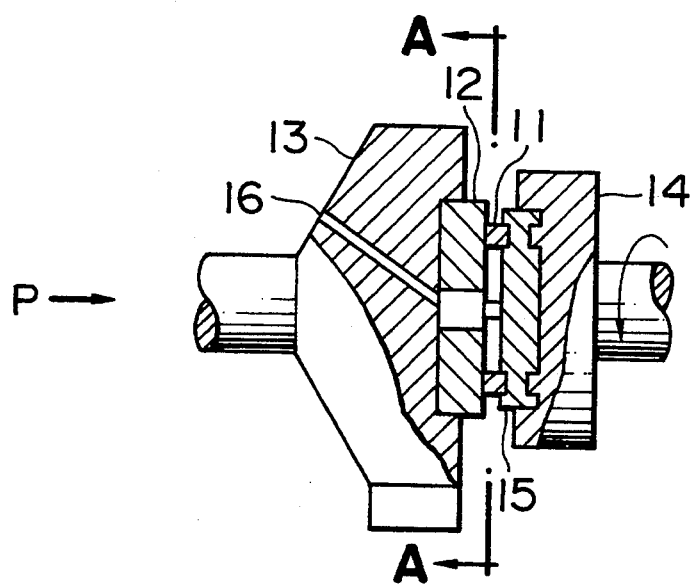
FIG. 3 is a cross sectional view which illustrates a very-high-pressure wearing test apparatus.
Figure 4:
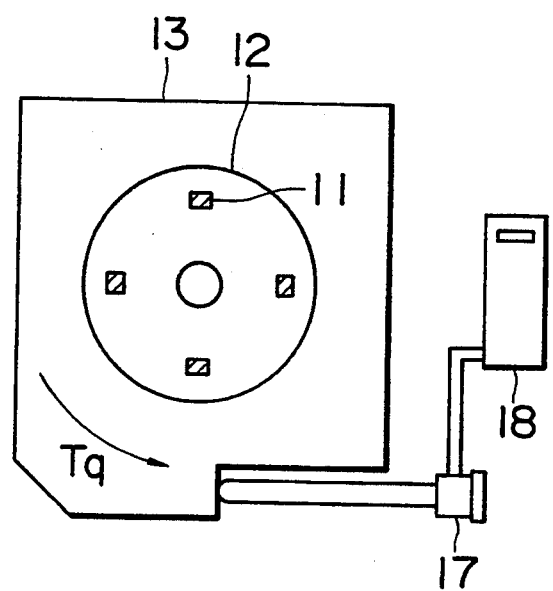
FIG. 4 is a cross sectional view taken along line A—A of FIG. 3.

The characteristics of the materials shown in Table 1 were evaluated by experiment. Table 2 shows the results of a seizure test, a wearing test and the quantity of volume reduction occurring due to 10% sulfuric acid and carboxylic acid (5% acetic acid +5% formic acid) to which the samples shown in FIG. 2 were subjected. The foregoing tests were performed by using a very-high pressure wear resistance test machine. The schematic shape of the test piece is shown in FIGS. 3 and 4. The seizure test was performed by making use of the foregoing test machine under the following conditions.

| | |
|---|---|
| Wearing speed: | 8 m/s |
| Pressure on the frictional surface: | initial pressure 20 kgf/cm$^2$, pressure was raised at a rate of 10 kgf/cm$^2$/3 minutes |
| Lubricant oil: | motor oil #30, temperature 80° C., lubricant oil was supplied at a rate of 400 ml/min from the center of stator holder |
| Detection of seizure: | a load cell and a dynamic distortion meter were used to detect the seizure (abnormal frictional force was detected at the time of occurrence of seizure) |
| Material to be joined: | JIS gray cast iron type 4 (FC25) The wearing test was performed under the following conditions to measure the quantity of wear of the test piece. |
| Frictional speed: | 3 m/s |
| Pressure on the frictional surface: | 80 kgf/cm$^2$ |
| Lubrication oil: | temperature 80° C., lubricating oil was supplied at a rate of 400 ml/min from the center of a stator holder |
| Wearing test distance: | 50 km |
| Material to be joined: | JIS gray cast iron type 4 (FC25) |

The volume reduction occurring due to corrosion was measured in the following two cases where samples (the samples, the outermost surface of each of which was removed) each having a size of 10 mm$\phi$ 20 mmL and nitrided with gas were immersed in 10% sulfuric acid at 40° C. for 40 hours; and where the samples were immersed in 5% acetic acid, 5% formic acid and water (60° C.) for 40 hours.

As can be seen from Table 2, the piston ring according to the present invention exhibits a significant improvement in the seizure resistance and reduction in the quantity of wear as contrasted with the conventional materials. The reason for this is that the proportion of chromium is raised as compared with the conventional materials and the addition of Mo, W, V and Nb further materials and the addition of Mo, W, V and Nb further improve the foregoing effect, The evaluation of the corrosion resistance performed by immersing the samples in 10% sulfuric acid resulted in a trend that the addition of Co and Mo enabled a significant effect to be obtained. The evaluation of the corrosion resistance performed by immersing the samples in 10% carboxylic acid resulted in that a significant effect was obtained when Co, Ni and Cu were added, such that the corrosion resistance was significantly improved as compared with the oil ring made of the conventional material.

Since the piston ring according to the present invention contains chromium by a quantity more than 20.0%, satisfactory corrosion resistance cannot be obtained by the usual cold drawing process because of breakage of carbides in the drawn wire and generation of microvoids. However, the present invention employs the warm rolling die so that the wire can be drawn to have a considerably complicated lateral cross sectional shape while preventing generation of the internal defects. No. 1 to No. 4 samples, which were iron-alloy oil ring containing C-Si-Mn-Cr and according to the present invention, enabled the characteristics to be improved significantly as compared with the conventional oil ring. The adequate addition of Mo, W, V, Nb, Co, Ni and Cu by a specific quantity range further improved the foregoing effects.

EXAMPLE 2

Figure 5:
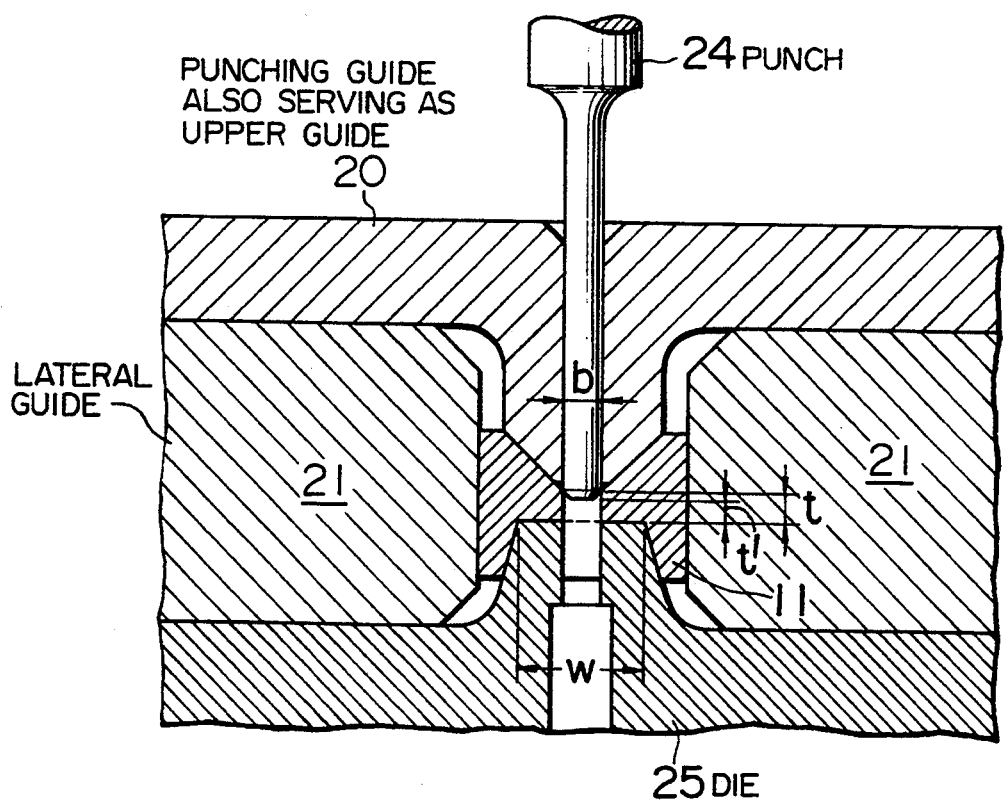
FIG. 5 illustrates an example of the cross sectional shape of a punching apparatus for forming, by punching, oil passage holes in the web portion of a wire having a cross sectional shape and as well as explaining symbols given to dimensions.

Wire materials, the compositions of which were arranged as shown in FIG. 3, were used to manufacture steel wires each having deformed cross sectional shapes for two-piece oil rings by a warm rolling die machining method using the apparatus and employing the manufacturing conditions similar to Example 1, the wires thus manufactured having cross sectional dimensions such that width B=3.8 mm, W (fillet radius was ignored and also recess, if any, is ignored) shown in FIG. 5 was 2.0 mm, the total thickness T=12.3 mm, the web thickness t=0.65 mm (t/T=0.283). Then, the wires were annealed in a continuous annealing furnace while applying tension. An example of the hardness was HV=260, while exhibiting hardness dispersion of not higher than HV 25, both of the plain bend and the lateral bend were 1 mm/1000 mm or less, twist was 0.5°/1000 mm or less and dispersion of the web portion thickness was not greater than 0.020 mm per a length of 200 mm.

The foregoing deformed wires were then subjected to a punching process in which oil passage holes, the width b of each of which was 1.45 mm, the length a of each of which was 3.5 mm and the intervals C between the pierced oil holes were 1 mm were formed by 3000 times of punching operations (W−b=2−1.45=0.55=0.85 t, t=0.65 mm).

As a result, each lot resulted in no breakage of the punch and the die while wear of a degree of 0.020 mm was observed at the edges of the punch and the die. Further, dispersion of the pitch of the oil passages formed by punching was satisfactorily prevented to ±0.050 mm or less. In addition, the heights of the flashes were 0.025 mm or less as a result of the observation of the oil holes at the two ends of the test material.

Then, the wires each having the deformed cross sectional shape and having the oil holes were quenched and tempered to about HV 400, and then they were subjected to a continuous bending work to have an inner diameter of 90 mm. A breakage of a type starting from the flash formed at the time of the bending work and another type breakage did not take place. The dispersion of the widths after quenching and tempering had been completed resulted in an excellent value of 0.002 mm.

EXAMPLE 3

Wire materials, the compositions of which were arranged as shown in FIG. 3, were used to manufacture steel wires each having deformed cross sectional shapes for two-piece oil rings by a warm rolling die machining method, the wires thus manufactured having cross sectional dimensions such that width B=2.0 mm, W shown in FIG. 5 was 1.05 mm, the total thickness T=1.8 mm, the web thickness t=0.50 mm (t/T=0.278). Then, the wires were annealed in a continuous annealing furnace. An example of the hardness was HV=260, while exhibiting hardness dispersion of HV 25 or less, both of the plain bend and the lateral bend were 1 mm/1000 mm or less, twist was 0.5°/1000 mm or less and dispersion of the web portion thickness was 0.020 ram or less per a length of 200 mm.

The foregoing materials were subjected to a process of simultaneously forming oil passage holes each having a width b=0.50 mm, a length a=2.8 mm, disposed at intervals C=4.2 mm in the holes units by a number of punching operations of 5000 times (total times=3×5000 =15000 times) (W−b=1.05−0.5−0.55=1.1 t, t=0.5 mm).

As a result, each lot resulted in no breakage of the punch and the die while wear of a degree of 0.020 mm was observed at the edges of the punch and the die. Further, dispersion of the pitch of the oil passage holes formed by punching was satisfactorily prevented to ±0.050 mm or less. In addition, the heights of the flashes were 0.020 mm or less as a result of the observation of the oil holes at the two ends of the test material.

Then, a non-drive type four-way rolls (vertical rolls and horizontal rolls) having a pass was used to subject the materials to a skin pass modification pass for pressing the materials in only the widthwise direction by about 0.040 mm, and to a modification-limited pass in which pressure was so applied as to prevent a dimension change to measure the widthwise expansion (B'−B shown in FIG. 7). As a result, total expansion of 0.040 to 0.050 mm resulted after the punching work had been completed was reduced to 0.007 mm or less after the former process had been performed and to 0.010 mm or less after the latter process had been performed.

Finally, the wires each having the deformed cross sectional shape and the pierced oil holes were quenched and tempered to about HV 400, and then subjected to a continuous bending work to have an inner diameter of 60 mm. Breakage of a type starting from the flash formed at the time of the bending work and another type breakage did n to take place.

The materials used in the foregoing embodiment and having the expansion of 10.040 mm to 0.050 mm were modified with light pressure applied from the right and left portions by using a pair of rolls. As a result, the expansion of each of the wires was reduced to 0.014 mm or less.

EXAMPLE 4

Wire material test samples No. 1, 5, 8 and 18 shown in Table 1 and Nos. 1, 3 and 5 shown in Table 3 were used to manufacture steel wires each having complicated cross sectional shapes for two-piece oil rings by a warm rolling die machining method, the wires thus manufactured having cross sectional dimensions such that width B=2.0 mm, T=1.85 mm, W shown in FIG. 5 was 0.78 mm, the web thickness t=0.55 mm (t/T=0.55/0.85=0.297). Then, the wires were annealed in a continuous annealing furnace, and pieced oil holes each having a width t=0.55 mm, a length a 2.5 mm, and disposed at intervals C=2.5 mm (W−b=0.78−0.55=0.23=0.418 t, C/t=4.5) were formed by punching. By using the non-drive type four-way rolls was used to modify the expansion in the widthwise direction similarly to Example 3. As a result, the widthwise dimension dispersion was 0.005 mm or less. The materials thus-modified were continuously quenched and tempered to have a Vickers hardness of HV 360 to 400 (dispersion in each material lot HV≦30), and then a curling test to have a diameter of 65 mm was performed. As a result, a fact, that generation of defects, such as polygonal shape and cracks, was not observed, was confirmed.

As described above, the section wire for the oil ring according to the first aspect of the present invention and the oil ring according to the invention were caused to contain larger quantity of chromium so that the seizure generation surface pressure can be lowered and generation of scuffs during the operation can significantly be prevented as compared with the conventional structures. Further, wear resistance superior to the conventional materials was obtained. In addition, corrosion resistance against sulfuric acid and carboxylic acid was excellent, and particularly significant corrosion resistance against carboxylic acid was attained. Therefore, the structure according to the present invention can be adapted to alcohol type fuel.

The features of the present invention enabled the dimension limitation present for the pierced oil holes in the deformed wire for the oil ring disclosed in JP-A-4-333545 to be relieved by employing the method according to the present invention so that the novel confirmed region is regulated. The present invention provides a method of manufacturing the deformed steel wire having oil passage holes for the oil ring in which at least a pair of rolls are used to press and modify the deformation including the expansion of the material to be punched occurring when the oil passage holes are formed by punching, the rolls being disposed in the direction of the expansion.

As a result of the features of the present invention, the oil ring and the section material of oil ring can be manufactured which exhibits excellent scuffing resistance, wear resistance, corrosion resistance and oil scraping performance while necessitating only a small cross sectional area. Therefore, adaptation to a small-size internal combustion engine is enabled and an effect of reducing the cross sectional area can be obtained.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A section steel wire for an oil ring for use in an internal combustion engine, chemically consisting essentially of, by weight:
    0.6 to 1.5% carbon, not more than 1.5% Si, not more than 1.5% Fin, more than 20% and not more than 25% Cr, and optionally containing
    at least one group selected from three groups consisting of a group of at least one element of Mo and W in total amount of not more than 3% of "Mo+W/2", another group of at least one element of V and Nb in total amount of not more than 3% of "V+Nb/2" and still another group of at least one element selected from not more than 12% Co, not more than 5% Ni and not more than 5% Cu, and balance of Fe and unavoidable impurities, wherein:
the section steel wire has been subjected to a quenching heat-treatment followed by a tempering heat-treatment so as to have a Vickers hardness of HV 300 to HV 450, the section steel wire has a substantially H- or X shaped cross-section, having a web portion and flange portions, which is provided by working a blank steel wire having a rectangular or square cross-section by forming longitudinal recesses on two opposite sides of the rectangular blank steel wire respectively, and a thickness ratio of the thickness of the web portion bridging the flange portions to the total thickness (T) of the flange portions is not greater than 0.3.

2. A section steel wire according to claim 1, wherein the web portion has a plurality of oil passage holes being-formed by punching in a longitudinal linear row line, and at least one of the opposite surfaces of the web portion is substantially flat, and wherein the following conditions are met:

$$W - b \geq 0.4\ t,$$

$$C \geq t,$$

$W =$ a specified width of the substantially flat surface of the web portion,
$b =$ a breadth of the oil passage hole,
$t =$ a height of a breadthwise wall surface of the oil passage hole, and
$C =$ the spacing between adjacent oil passage holes.

3. A section steel wire according to claim 2, having a width of not greater than 3.0 mm, wherein dispersion of the width is not greater than 0.015 mm after a finishing plastic working process but before a grinding process.

4. An oil ring for use in an internal combustion engine, having a surface treatment layer formed on at least a sliding surface thereof which makes a sliding contact with an inner surface of a cylinder of the internal combustion engine, and chemically consisting essentially of, by weight:
0.6 to 1.5% carbon, not more than 1.5% S i, not more than 1.5% Mn, more than 20% and not more than 25% Cr, and optionally containing
at least one group selected from three groups consisting of a group of at least one element of Mo and W in total amount of not more than 3% of "Mo+W/2" another group of at least one element of V and Nb in total amount of not more than 3% of "V+Nb/2" and still another group of at least one element selected from not more than 12% Co, not more than 5% Ni and not more than 5% Cu, and
balance of Fe and unavoidable impurities, wherein:
the section steel wire has been subjected to a quenching heat-treatment followed by a tempering heat-treatment so as to have a Vickers hardness of HV 300 to HV 450, the section steel wire has a substantially H- or X-shaped cross-section, having a web portion and flange portions, which is provided by working a blank steel wire having a rectangular or square cross-section by forming longitudinal recesses on two opposite sides of the rectangular blank steel wire respectively, and a thickness ratio of the thickness of a web portion bridging flange portions to the total thickness (T) of the flange portions is not greater than 0.3, the web portion having a plurality of oil passage holes being formed by punching in a longitudinal linear row line, at least one of the opposed surfaces of the web portion being substantially flat, and wherein the following conditions are met:

$$W - b \geq 0.4\ t,$$

$$C \geq t,$$

wherein:
$W =$ a specified width of the substantially flat surface of the web portion,
$b =$ a breadth of the oil passage hole,
$t =$ a height of a breadthwise wall surface of the oil passage hole, and
$C =$ the spacing between adjacent oil passage holes.

5. A section steel wire for use in an internal combustion engine, chemically consisting essentially of, by weight:
more than 0.80% and less than 0.95% carbon, no more than 1.0% Si, not more than 1.0% Mn, not less than 15.9% and not more than 20.0% Cr, and
optionally containing at least one group selected from three groups consisting of a group of at least one element of Mo and W in a total amount of not less than 0.5% and not more than 3% of "Mo+W/2" another group of at least one element of V and Nb in a total amount of not less than 0.05% and not more than 2% of "V+Nb/2" and another group of at least one element selected from not more than 12% Co, not more than 5% Ni and not more than 5% Cu, and
balance of Fe and unavoidable impurities, wherein:
the section of steel wire has been subjected to a quenching heat-treatment followed by a tempering heat-treatment so as to have a Vickers hardness of HV 300 to HV 450, the section steel wire has a substantially H- or X shaped cross-section, having a web portion and flange portions, which is provided by working a blank steel having a rectangular or square cross-section by forming longitudinal recesses on two opposite sides of the rectangular blank steel wire respectively, and a thickness ratio of the thickness of the web portion bridging flange portions to the total thickness of the flange portions is not greater than 0.3, the web portion having a plurality of oil passage holes being formed by punching in a longitudinal linear row line, at least one of the opposed surfaces of the web portion being substantially flat, and wherein the following conditions are met:

$$1.4\ t > W - b \geq 0.4\ t,$$

$$C \geq t,$$

wherein:
$W =$ a specific width of the substantially flat surface of the web portion,
$b =$ a breadth of the oil passage hole,
$t =$ a height of a breadthwise wall surface of the oil passage hole, and
$c =$ the spacing between adjacent oil passage holes.

6. A section steel wire according to claim 5, having a width of not greater than 3.0 mm, wherein dispersion of the width is not greater than 0.015 mm after a finishing plastic working process but before a grinding process.

7. An oil ring for use in an internal combustion engine, having a surface treatment layer formed on at least a sliding surface thereof which makes a sliding contact with an inner surface of a cylinder of the internal combustion engine, and chemically consisting essentially of, by weight:

more than 0.80% and less than 0.95% carbon, not more than 1.0% Si, not more than 1.0% Mn, not less than 15.0% and not more than 20.0% Cr, and optionally containing at least one group selected from three groups consisting of a group of at least one element of Mo and W in total amount of not less than 0.5% and not more than 3% of "Mo+W/2", another group of at least one element of V and Nb in total amount of not less than 0.05% and not more than 2.0% of "V+Nb/2" and still another group of at least one element selected from not more than 12% Co, not more than 5% Ni and not more than 5% Cu, and balance of Fe and unavoidable impurities, wherein:

the section steel wire has been subjected to a quenching heat-treatment followed by a tempering heat-treatment so as to have a Vickers hardness of HV 300 to HV 450, the section steel wire has a substantially H- or X-shaped cross-section, having a web portion and flange portions, which is provided by working a blank steel wire having a rectangular or square cross-section by forming longitudinal recesses on two opposing sides of the rectangular blank steel wire respectively, and a thickness ratio of the thickness of a web portion bridging flanges to the total thickness (T) of the web portion having a plurality of oil passage holes being formed by punching in a longitudinal linear row line, at least one of the opposed surfaces of the web portion being substantially flat, and wherein the following conditions are met:

$W - b \geq 0.4\ t,$ $C \geq t.$ wherein:

W = a specified width of the substantially flat surface of the web portion, b = a breadth of the oil passage hole, t = a height of a breadthwise wall surface of the oil passage hole, and C = the spacing between adjacent oil passage holes.

* * * * *